Patented Dec. 28, 1926.

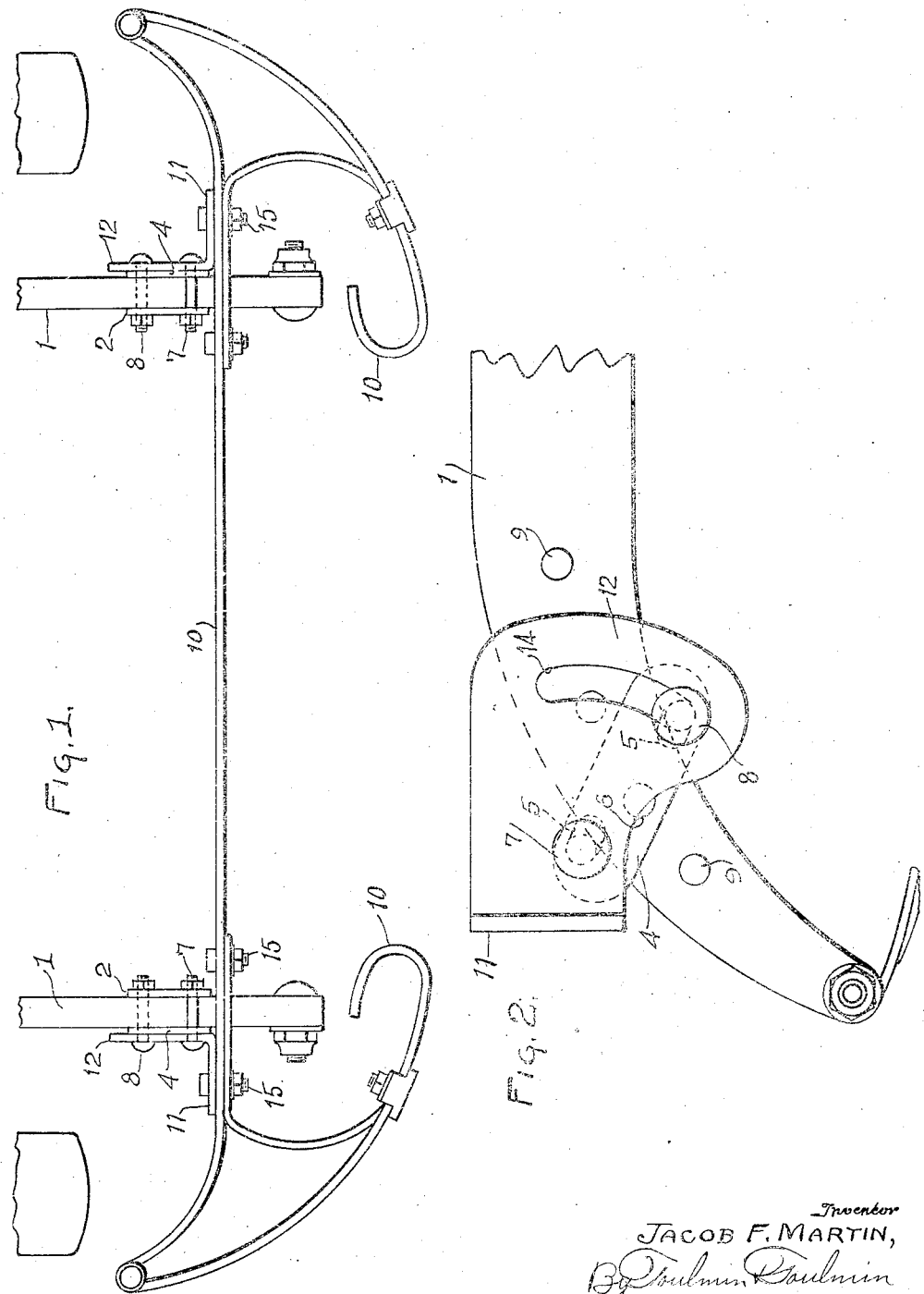

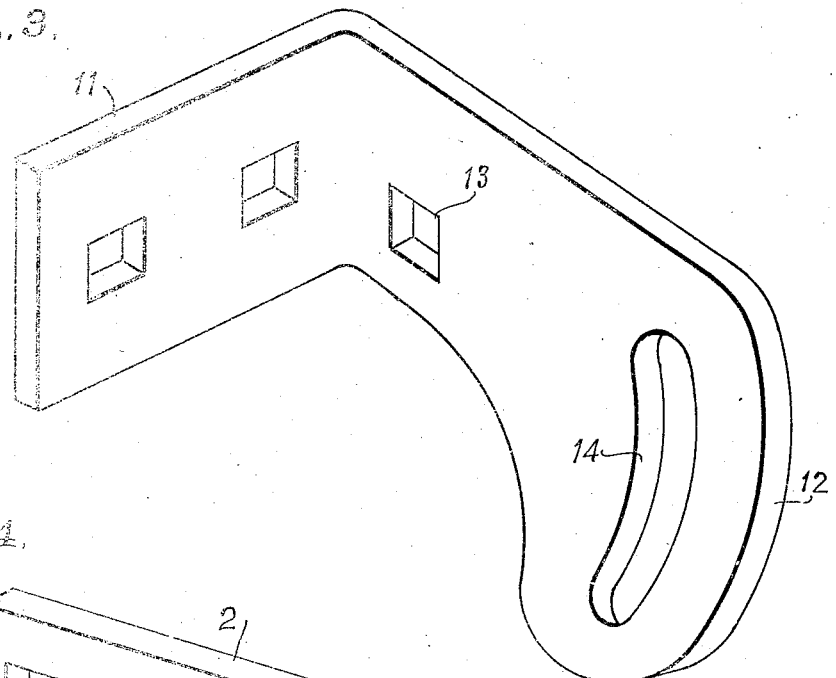
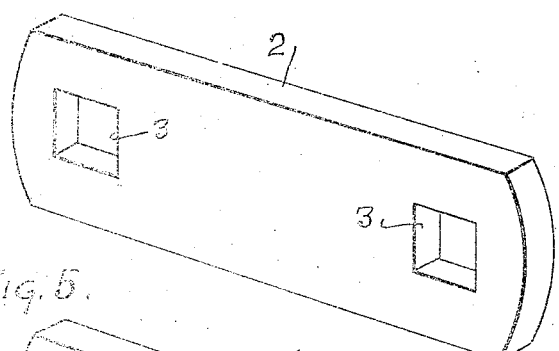
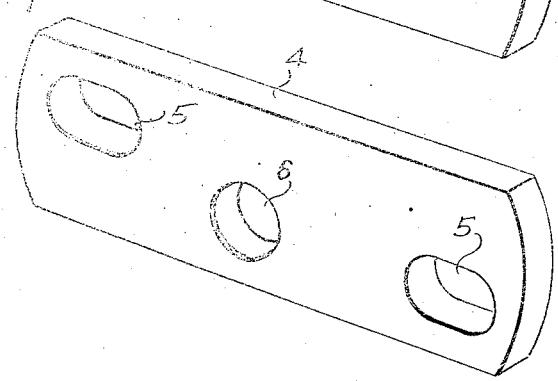

1,612,301

UNITED STATES PATENT OFFICE.

JACOB F. MARTIN, OF BELLEVUE, OHIO, ASSIGNOR TO THE BELLEVUE MANUFACTURING COMPANY, OF BELLEVUE, OHIO, A CORPORATION OF OHIO.

BUMPER-ATTACHING DEVICE.

Application filed October 7, 1926. Serial No. 140,143.

This invention relates to bumper or bumperette attaching devices for automobiles.

The invention consists essentially of a bumper or bumperette attaching device combined with securing-bolts adapted to be positioned at various places on the rear curve or so called "angle" of automobile chassis frames or bars, so that the bumper or bumperette to be attached, may be properly positioned with respect to the wheel fender.

In the accompanying drawings:

Fig. 1 is a plan view showing my invention applied to an automobile frame with attached bumperettes;

Fig. 2 is a side elevation of the device secured to a chassis bar;

Fig. 3 is a detailed view of the bracket portion of my device;

Fig. 4 is a detailed view of one of the clamping plates; and

Fig. 5 is a detailed view of the other clamping plate.

In the drawings, 1 indicates the frame of an automobile. A clamping bar 2 having openings 3 adjacent its opposite ends, is placed against the inner side of one of the chassis bars of an automobile frame and a second clamping bar 4, having slots 5 adjacent its opposite ends, is placed on the outside of the said chassis bar opposite the bar 2, said clamping bars being rigidly held in position by bolts and nuts, 7 and 8 passing through the openings 3 and slots 5. The plate 4 has an opening 6 off its center, as shown. In some cars, the frame is provided with lugs, as shown at 9, and the opening 6 is adapted to fit over such a lug and by being located off center, the reversing of the plate 4 on the frame will permit of endwise adjustment of the attachment relatively to the frame, so that the main bar of a bumper or bumperette 10 may be positioned at different distances from the frame.

The bumper carrying member proper comprises a bracket plate bent at an angle, one portion 11, adapted to have a bumper or bumperette attached thereto and a segment shaped portion 12 with an opening 13 through which passes the bolt 7 forming a pivot about which the bracket may be adjusted. The segment shaped portion is further provided with a curved slot 14 adjacent its outer end, through which passes the bolt 8, said slot permitting the movement of the bracket about the bolt 7 to position the bracket at the desired angle to the frame. The bumper may be secured to the bracket by bolts 15, as shown, or by hook bolts or by a combination of the two.

In securing the attaching device to an automobile, the clamping bars are placed on opposite sides of the chassis frame with the bolts 7 and 8 extending through the openings therein, the diagonally oppositely disposed slots 5 in the bar 4 permitting of shifting the bar 4 relatively to the bar 2 to adjust these clamping bars to the particular downward curve of the ends of the chassis frame. In this way the clamping bars may be adjusted to the varying sizes of chassis frame on different makes of automobiles, as well as positioned at different places on a given car. The bracket member which is also secured in position by the bolts 7 and 8 is adjusted about the bolt 7 relatively to the frame, so that when the bumper is carried thereby, it will be properly positioned with respect to the wheel fender.

From the foregoing description, it will be seen that I have provided an adjustable attachment for rear bumpers or bumperettes which is simple in construction, light in weight, and inexpensive to manufacture.

It will be understood that I desire to comprehend within my invention such modifications as may be necessary to adapt it to varying conditions and uses.

Having thus fully described my invention, what I claim as new and desire to secure by Letters Patent, is:

1. In an attaching device for bumpers, the combination with a bracket plate having a slot near one end, of clamping bars adapted to be positioned at different places on the chassis frame, and securing bolts extending through the bracket plate and the clamping bars, one of the bolts occupying the slot in the plate, whereby the device may be positioned at various places so as to in turn position the bumper to protect the fender.

2. In an attaching device for bumpers, the combination with a bracket plate having a slot near one end and an opening removed from said slot, of clamping bars adapted to be positioned at different places on the chassis frame, and securing bolts extending through the bracket plate and the clamping bars, one of the bolts occupying the slot and the other the opening in the bracket plate, whereby the device may be positioned at various places so as to in turn position the bumper to protect the fender.

3. In an attaching device for bumpers, the combination with a bracket plate having a slot near one end and an opening removed from said slot, a portion of said plate being bent at an angle thereto and adapted to have a bumper attached to it, of clamping bars adapted to be positioned at different places on the chassis frame, and securing bolts extending through the bracket plate and the clamping bars, one of the bolts occupying the slot and the other the opening in the bracket plate, whereby the device may be positioned at various places so as to in turn position the bumper to protect the fender.

4. In an attaching device for bumpers, the combination with a bracket plate having a slot near one end, of clamping bars adapted to be positioned on the chassis frame, one of said bars having oppositely disposed elongated slots so that the bars may be positioned at different places on the chassis frame, and securing bolts extending through the bracket plate and the clamping bars, one of the bolts occupying the slot in the plate, whereby the device may be positioned at various places so as to in turn position the bumper to protect the fender.

5. In an attaching device for bumpers, the combination with a bracket plate having a slot near one end, of clamping bars adapted to be positioned on the chassis frame, one of said bars having openings near its opposite ends and the other having slots near its opposite ends, so that the bars may be adjusted to the different curves on the various makes of automobiles, and securing bolts extending through the bracket plate and the clamping bars, one of the bolts occupying the slot in the plate, whereby the device may be positioned at various places so as to in turn position the bumper to protect the fender.

6. In an attaching device for bumpers, the combination with a bracket plate having a slot near one end, of clamping bars adapted to be positioned on the chassis frame, one of said bars being slotted near its opposite ends and having an opening between said slots and off center of the bar, and securing bolts extending through the bracket plate and the clamping bars, one of the bolts occupying the slot in the plate, whereby the device may be positioned at various places so as to in turn position the bumper to protect the fender.

7. In an attaching device for bumpers, the combination with a bracket plate having a slot near one end and an opening removed from said slot, a portion of said plate being bent at an angle thereto and adapted to have a bumper attached to it, of clamping bars adapted to be positioned on the chassis frame, one of said bars having openings near its opposite ends and the other of said bars having slots near its opposite ends and an opening between said slots and off center of said bar, and securing bolts extending through the bracket plate and the clamping bars, whereby the attaching device may be positioned at various places on the chassis frame so as to in turn position the bumper to protect the fender.

In testimony whereof, I affix my signature.

JACOB F. MARTIN.